J. PRATT.
AUTOMATIC, ODORLESS, SELF CLEANING STREET INLET AND WATER CLOSET FLUSH.
APPLICATION FILED OCT. 10, 1907.
931,481.
Patented Aug. 17, 1909.
2 SHEETS—SHEET 1.
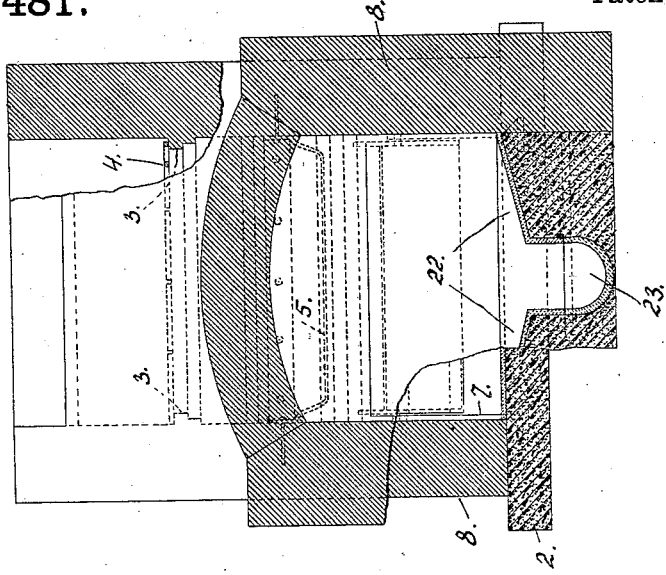
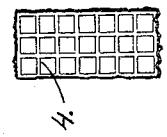
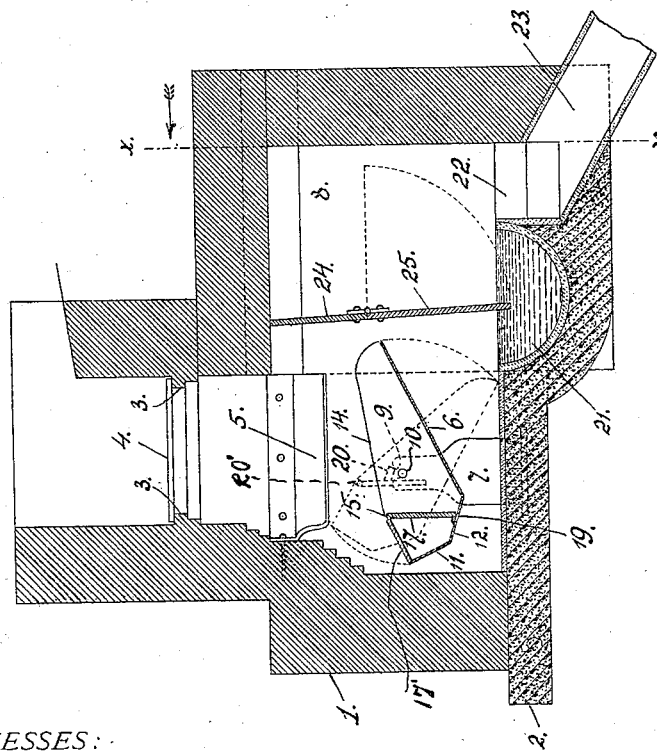
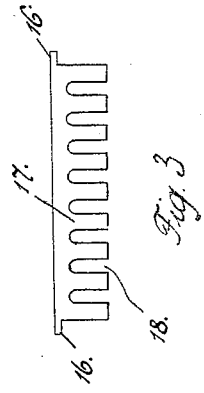
WITNESSES:
A. H. Rabsaig,
K. H. Butler
INVENTOR
Joseph Pratt
BY H. C. Everitt Co.
Attorneys J. PRATT.
AUTOMATIC, ODORLESS, SELF CLEANING STREET INLET AND WATER CLOSET FLUSH.
APPLICATION FILED OCT. 10, 1907.
931,481.
Patented Aug. 17, 1909.
2 SHEETS—SHEET 2.
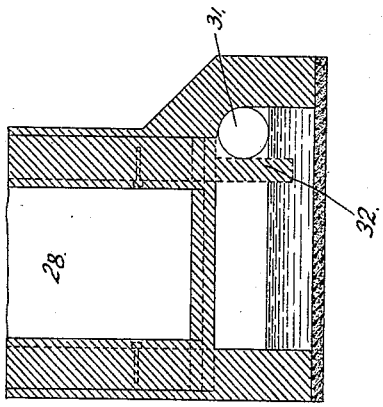
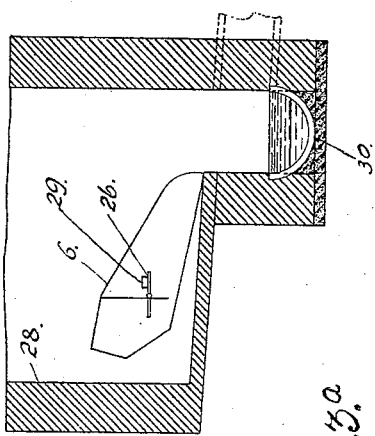
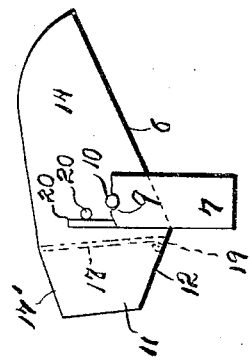
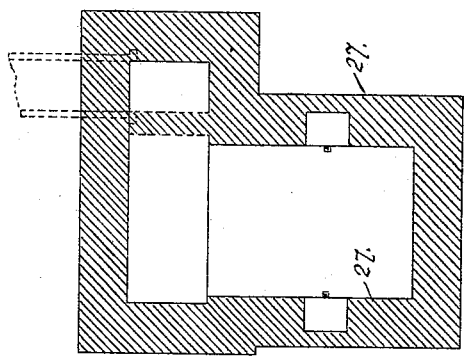

UNITED STATES PATENT OFFICE.

JOSEPH PRATT, OF McKEESPORT, PENNSYLVANIA.

AUTOMATIC, ODORLESS, SELF-CLEANING STREET-INLET AND WATER-CLOSET FLUSH.

No. 931,481.  Specification of Letters Patent.  Patented Aug. 17, 1909.

Application filed October 10, 1907. Serial No. 396,740.

*To all whom it may concern:*

Be it known that I, JOSEPH PRATT, a citizen of the United States of America, residing at McKeesport, in the county of Allegheny and State of Pennsylvania, have invented certain new and useful Improvements in Automatic, Odorless, Self-Cleaning Street-Inlet and Water-Closet Flushes, of which the following is a specification, reference being had therein to the accompanying drawing.

This invention relates to improvements in automatic, odorless, self-cleaning, street-inlet and water closet flushes, and the invention is an improvement upon the sewer trap shown and described in Letters Patent #710,209, granted to me September 30th, 1902.

The present improvement consists in the novel combination and arrangement of parts whereby a more effective trap or vault structure is obtained, also a more positive flushing of the trap or vault after the delivery from a sewer or soil pipe.

The detailed construction entering into my invention will be presently described, and then specifically pointed out in the appended claims.

Referring to the drawings: Figure 1 is a vertical sectional view of the trap constructed in accordance with my invention, Fig. 2 is a cross sectional view of the same taken on the line $x$—$x$ of Fig. 1, looking in the direction of the arrow of said figure, Fig. 3 is an elevation of a door used in connection with the trap, Fig. 3ᵃ is a detail side elevation of the tilting trap removed, showing one of the standards therefor and the means for limiting the movement of the trap in each direction and the cushioning thereof. Fig. 4 is a plan of a portion of a grate used in connection with the trap, Fig. 5 is a horizontal sectional view of a vault constructed in accordance with my invention, Fig. 6 is a vertical sectional view of the same, and Fig. 7 is a cross sectional view of the vault.

In the accompanying drawings, I have illustrated masonry structure 1 for housing the trap. The structure or housing is erected upon a firm foundation 2, preferably constructed of concrete. In building the structure 1, I provide ledges 3 for supporting a grate 4, said grate preventing large pieces of waste material from passing through the structure into a sewer. Directly beneath the grate 4 I arrange deflector plates 5, said plates being secured to the sides and one end of the structure 1. These plates prevent waste material from running down the sides of the structure and deflects said waste matter directly into a tiltable trap 6 located upon the foundation 2 of the structure 1.

In the foundation 2 are embedded the lower ends of standards or bearings 7, said standards or bearings being arranged against the side walls 8 of the structure 1, and provided at their upper ends with sockets 9 for the trunnions or short shafts 10 of the trap 6.

This trap 6 is substantially scoop-shaped in form, having a back wall 11 connecting with the bottom of the trap by an incline portion 12. The side walls 14 of the trap are provided with sockets 15 for the pintle ends 16 of a door 17, which is provided throughout its length along its lower edge with a series of openings or slots 18 for the purpose as will presently appear. The door 17 is limited in a swinging movement by lugs 19 carried by the incline portion 12 of the trap. A short overlying wall 17′ closes the space at the top of the trap between the rear wall 11 and the upper edge of the door.

As the trap 6, is shown in full lines in Fig. 1, it is properly balanced to receive waste matter and to hold a considerable quantity before discharging. When the trap is overbalanced to discharge its contents, its tilting movement is cushioned by stops or buffers 20 arranged upon the sides 14 of the trap to impinge the upper ends of the bearings 7. The trap is held in normal position until overbalanced by filling, by the cushions or buffers 20 engaging with stops 20′ which may be arranged either in the walls of the structure 1 or be in the form of an extension carried by the standards or bearings 7. The trap 6 is adapted to discharge its contents into a transversely arranged gutter 21 formed in the concrete foundation 2. The gutter is adapted to discharge into incline chutes 22 communicating with a sewer (not shown) through the medium of a conduit 23.

Above the gutter 21 is arranged a transverse incline partition 24, having a hinged gate 25.

In practice the structure 1 is located below a street or pavement, commonly a juncture of two streets, to receive the waste water from the pavements and gutters of the street, the structure being closed by a man-hole plate or suitable closure (not shown). As heretofore stated, the grate 4 retains the solid waste matter, while the water, dirt and sediment passes through the grate and is deflected by the plates 5 into the trap 6, which holds the same until such time as the load in said trap is of a sufficient weight to cause the same to tilt in the manner shown in dotted lines in Fig. 1 of the drawings, thus discharging the contents into the gutter 21 of the foundation 2. As this gutter overflows, the gate 25 will be raised and the waste discharged into the incline chutes 22, where it is carried off into the sewer. Previously to the trap 6 being tilted the water contained in said trap would lie naturally in the lowest part thereof, or, in other words, in the rear of the trap-door 17, which door prevents the greater part of the sediment or waste from passing into the chamber thus provided for the water, so that the water will act as a flush for carrying out any dirt or sediment in the trap, when the latter is tilted, and thereby wash the same out of the trap into the gutter 21. If the dirt and sediment as accumulated back of the door 17 are not sufficient to force this door out of the way when the trap is tilted, the dirt or sediment will be washed through the openings 18, the door serving to prevent too-free escape of the water contained in the back of the scoop-trap when the same is tilted.

The dirt or sediment lying in the gutter 21 in excess of what was discharged during one flushing, may be forced downwardly on the next flushing operation of the trap, the gate 25 serving to prevent the dirt or sediment from being forced out in the incline chutes and the sewer in such quantities that there would not be sufficient water to carry the same away.

In Figs. 5 to 7 inclusive, I have illustrated a masonry structure and trap particularly designed for out buildings having sewer connections. The trap 6, which I have illustrated diagrammatically, is trunnioned upon brackets 26 arranged in the side walls 27 of the structure 28, and the sides of the trap are provided with buffers or stops 29 for limiting the tilting movement of the trap and preventing the edge thereof from wearing away the structure. The trap 6 in all other respects is similar to the one previously described, and is adapted to discharge into a gutter or basin 30 in communication with a sewer 31. A bridge wall 32 shields the opening of the sewer 31 and serves functionally the same purpose as the gate 25.

I do not care to confine myself to the specific arrangement of the trap within the structure, and reserve the right to make such structural changes as are permissible by the appended claims.

Having fully described my invention, what I claim and desire to secure by Letters Patent is:

1. In a sewer trap and flush, a housing having an inlet and an outlet, and a trap tiltably-mounted in said housing, the said trap having a bottom provided with an upwardly-inclined rear portion, a rear wall extending upwardly at a rearwardly-extending inclination, a door hung to swing between the side walls of the trap, and provided with openings along its lower edge, means carried by said upwardly-inclined portion of the bottom for limiting the rearward movement of said door, buffers carried by the side walls of said trap, and stops arranged to be engaged by said buffers to limit the rearward tilting movement of the trap.

2. A tiltably-mounted automatically-dumping sewer trap, comprising a trap bottom provided with an upwardly-inclined rear portion, a rear wall extending upwardly at a rearwardly-extending inclination, said rear portion of the trap bottom being of a width substantially equal to the height of the rear wall, side walls connected to the bottom and rear wall and to said upwardly-inclined rear portion of the bottom, and a door hung to swing between said side walls and provided with openings along its lower edge.

In testimony whereof I affix my signature in the presence of two witnesses.

JOSEPH PRATT.

Witnesses:
MAX H. SROLOVITZ,
A. J. TRIGG.